United States Patent
Park et al.

(10) Patent No.: US 8,107,456 B2
(45) Date of Patent: Jan. 31, 2012

(54) METHOD OF PERFORMING UPLINK SYNCHRONIZATION IN WIRELESS COMMUNICATION SYSTEM

(75) Inventors: Sung Jun Park, Anyang-si (KR); Young Dae Lee, Anyang-si (KR); Seung June Yi, Anyang-si (KR); Sung Duck Chun, Anyang-si (KR)

(73) Assignee: LG Electronics Inc., Seoul (KR)

( * ) Notice: Subject to any disclaimer, the term of this patent is extended or adjusted under 35 U.S.C. 154(b) by 632 days.

(21) Appl. No.: 12/141,772

(22) Filed: Jun. 18, 2008

(65) Prior Publication Data

US 2008/0310396 A1   Dec. 18, 2008

Related U.S. Application Data

(60) Provisional application No. 60/944,785, filed on Jun. 18, 2007.

(30) Foreign Application Priority Data

Mar. 14, 2008   (KR) ........................ 10-2008-0023809

(51) Int. Cl.
  *H04J 3/06*   (2006.01)
  *H04B 7/212*   (2006.01)
  *H04L 12/28*   (2006.01)
  *H04L 12/56*   (2006.01)
(52) U.S. Cl. ................... 370/350; 370/324; 370/395.62; 370/503
(58) Field of Classification Search ................... 370/324, 370/350, 395.62, 503, 509, 512
  See application file for complete search history.

(56) References Cited

U.S. PATENT DOCUMENTS

| | | | |
|---|---|---|---|
| 4,205,200 A | 5/1980 | Parikh et al. | |
| 6,157,833 A | 12/2000 | Lawson-Jenkins | |
| 6,324,171 B1 | 11/2001 | Lee et al. | |
| 6,353,628 B1 | 3/2002 | Wallace et al. | |
| 6,526,027 B1 | 2/2003 | Yeom | |
| 6,567,409 B1 | 5/2003 | Tozaki et al. | |
| 6,725,267 B1 | 4/2004 | Hoang | |
| 7,197,317 B2 | 3/2007 | Parkvall | |

(Continued)

FOREIGN PATENT DOCUMENTS

EP   1148735   10/2001

(Continued)

OTHER PUBLICATIONS

Sammour, M., "Method and System for Enhancing Discontinuous Reception in Wireless Systems"; U.S. Appl. No. 60/863,185; Oct. 27, 2006.

(Continued)

*Primary Examiner* — Ronald Abelson
(74) *Attorney, Agent, or Firm* — Lee, Hong, Degerman, Kang & Waimey

(57) ABSTRACT

A method of performing uplink synchronization in a wireless communication system includes transmitting a random access preamble which is randomly selected from a set of random access preambles, receiving a random access response, the random access response comprising a random access preamble identifier corresponding to the random access preamble and a time alignment value for uplink synchronization, starting a time alignment timer after applying the time alignment value, starting a contention resolution timer after receiving the random access response, wherein contention resolution is not successful when the contention resolution timer is expired, and stopping the time alignment timer when the contention resolution timer is expired.

18 Claims, 8 Drawing Sheets

U.S. PATENT DOCUMENTS

| | | |
|---|---|---|
| 7,245,707 B1 | 7/2007 | Chan |
| 7,443,813 B2 | 10/2008 | Hwang et al. |
| 7,551,643 B2 | 6/2009 | Yeo et al. |
| 7,680,058 B2 | 3/2010 | Seurre et al. |
| 7,801,527 B2 | 9/2010 | Putcha |
| 7,899,451 B2 | 3/2011 | Hu et al. |
| 7,912,471 B2 | 3/2011 | Kodikara et al. |
| 2001/0017850 A1 | 8/2001 | Kalliokulju et al. |
| 2001/0044322 A1 | 11/2001 | Raaf |
| 2002/0028690 A1 | 3/2002 | McKenna et al. |
| 2002/0057663 A1 | 5/2002 | Lim |
| 2003/0007512 A1 | 1/2003 | Tourunen et al. |
| 2003/0050078 A1 | 3/2003 | Motegi et al. |
| 2003/0123485 A1 | 7/2003 | Yi et al. |
| 2003/0165133 A1 | 9/2003 | Garani |
| 2003/0189922 A1 | 10/2003 | Howe |
| 2003/0207696 A1 | 11/2003 | Willenegger et al. |
| 2004/0014452 A1 | 1/2004 | Lim et al. |
| 2004/0028078 A1 | 2/2004 | Beckmann et al. |
| 2004/0100940 A1 | 5/2004 | Kuure et al. |
| 2004/0117860 A1 | 6/2004 | Yi et al. |
| 2004/0121771 A1 | 6/2004 | Song et al. |
| 2004/0127265 A1 | 7/2004 | Van Bosch et al. |
| 2004/0180675 A1 | 9/2004 | Choi et al. |
| 2004/0185837 A1 | 9/2004 | Kim et al. |
| 2004/0253959 A1 | 12/2004 | Hwang et al. |
| 2005/0009527 A1 | 1/2005 | Sharma |
| 2005/0032555 A1 | 2/2005 | Jami et al. |
| 2005/0041610 A1 | 2/2005 | Lee et al. |
| 2005/0041681 A1 | 2/2005 | Lee et al. |
| 2005/0054365 A1 | 3/2005 | Ahn et al. |
| 2005/0085254 A1 | 4/2005 | Chuah et al. |
| 2005/0094670 A1 | 5/2005 | Kim |
| 2005/0141462 A1 | 6/2005 | Aerrabotu et al. |
| 2005/0141541 A1 | 6/2005 | Cuny et al. |
| 2005/0164719 A1 | 7/2005 | Waters |
| 2005/0176474 A1 | 8/2005 | Lee et al. |
| 2005/0180378 A1 | 8/2005 | Lee et al. |
| 2005/0185620 A1 | 8/2005 | Lee et al. |
| 2005/0232271 A1 | 10/2005 | Kettunen et al. |
| 2005/0238051 A1 | 10/2005 | Yi et al. |
| 2005/0265294 A1 | 12/2005 | Hu et al. |
| 2006/0034335 A1 | 2/2006 | Karaoguz et al. |
| 2006/0067324 A1 | 3/2006 | Kim et al. |
| 2006/0067364 A1 | 3/2006 | Jung et al. |
| 2006/0087994 A1 | 4/2006 | Barth et al. |
| 2006/0098567 A1 | 5/2006 | Willenegger et al. |
| 2006/0098688 A1 | 5/2006 | Parkvall et al. |
| 2006/0126554 A1 | 6/2006 | Motegi et al. |
| 2006/0165045 A1 | 7/2006 | Kim et al. |
| 2006/0203760 A1 | 9/2006 | Fukui et al. |
| 2006/0209870 A1 | 9/2006 | Lee et al. |
| 2006/0218271 A1 | 9/2006 | Kasslin et al. |
| 2006/0245417 A1 | 11/2006 | Conner et al. |
| 2006/0251105 A1 | 11/2006 | Kim et al. |
| 2006/0262811 A1 | 11/2006 | Jiang |
| 2007/0024972 A1 | 2/2007 | Kuerz et al. |
| 2007/0047582 A1 | 3/2007 | Malkamaki |
| 2007/0060139 A1 | 3/2007 | Kim et al. |
| 2007/0165567 A1 | 7/2007 | Tan et al. |
| 2007/0177569 A1 | 8/2007 | Lundby |
| 2007/0206531 A1 | 9/2007 | Pajukoski et al. |
| 2007/0248075 A1 | 10/2007 | Liu et al. |
| 2007/0258591 A1 | 11/2007 | Terry et al. |
| 2007/0291673 A1 | 12/2007 | Demirhan et al. |
| 2007/0291719 A1 | 12/2007 | Demirhan et al. |
| 2007/0291728 A1 | 12/2007 | Dalsgaard et al. |
| 2007/0291729 A1 | 12/2007 | Dalsgaard et al. |
| 2007/0291788 A1 | 12/2007 | Sammour et al. |
| 2008/0009289 A1 | 1/2008 | Kashima et al. |
| 2008/0043619 A1 | 2/2008 | Sammour et al. |
| 2008/0056198 A1 | 3/2008 | Charpentier et al. |
| 2008/0056273 A1 | 3/2008 | Pelletier et al. |
| 2008/0064390 A1 | 3/2008 | Kim |
| 2008/0076359 A1 | 3/2008 | Charpentier et al. |
| 2008/0089285 A1 | 4/2008 | Pirskanen et al. |
| 2008/0095185 A1 | 4/2008 | DiGirolamo et al. |
| 2008/0101268 A1 | 5/2008 | Sammour et al. |
| 2008/0167089 A1 | 7/2008 | Suzuki et al. |
| 2008/0181127 A1 | 7/2008 | Terry et al. |
| 2008/0182594 A1 | 7/2008 | Flore et al. |
| 2008/0225744 A1 | 9/2008 | DiGirolamo et al. |
| 2008/0225765 A1 | 9/2008 | Marinier et al. |
| 2008/0273610 A1 | 11/2008 | Malladi et al. |
| 2008/0280567 A1 | 11/2008 | Sharma |
| 2008/0310452 A1 | 12/2008 | Vedantham et al. |
| 2009/0086659 A1 | 4/2009 | Pani et al. |
| 2009/0086710 A1 | 4/2009 | Ho |
| 2009/0092076 A1 | 4/2009 | Zheng et al. |
| 2009/0109912 A1 | 4/2009 | DiGirolamo et al. |
| 2009/0143074 A1 | 6/2009 | Pelletier et al. |
| 2009/0163199 A1 | 6/2009 | Kazmi et al. |
| 2009/0181710 A1 | 7/2009 | Pani et al. |
| 2009/0318170 A1 | 12/2009 | Lee et al. |
| 2010/0027413 A1 | 2/2010 | Park et al. |
| 2010/0046384 A1 | 2/2010 | Lee et al. |
| 2010/0061330 A1 | 3/2010 | Hanov |
| 2010/0128669 A1 | 5/2010 | Chun et al. |
| 2010/0309877 A1 | 12/2010 | Damnjanovic et al. |
| 2011/0039536 A1 | 2/2011 | Lee et al. |

FOREIGN PATENT DOCUMENTS

| | | |
|---|---|---|
| EP | 1168877 | 1/2002 |
| EP | 1209938 | 5/2002 |
| EP | 1304898 | 4/2003 |
| EP | 1315356 | 5/2003 |
| EP | 1318632 | 6/2003 |
| EP | 1337124 | 8/2003 |
| EP | 1372310 | 12/2003 |
| EP | 1420551 | 5/2004 |
| EP | 1501328 | 1/2005 |
| EP | 1511245 | 3/2005 |
| EP | 1720322 | 8/2006 |
| EP | 1720373 | 11/2006 |
| JP | 2002539686 | 11/2002 |
| JP | 2003504935 | 2/2003 |
| JP | 2003-087180 | 3/2003 |
| JP | 2005354488 | 12/2005 |
| JP | 2006505979 | 2/2006 |
| JP | 2006067115 | 3/2006 |
| JP | 2006515737 | 6/2006 |
| KR | 10-2001-0105240 | 11/2001 |
| KR | 1020040039944 | 5/2004 |
| KR | 10-2004-0048675 | 6/2004 |
| KR | 1020050008440 | 1/2005 |
| KR | 10-2005-0027972 | 3/2005 |
| KR | 1020050096763 | 10/2005 |
| KR | 10-0877078 | 1/2009 |
| RU | 2249917 | 4/2005 |
| WO | 0074416 | 12/2000 |
| WO | 2004/043094 | 5/2004 |
| WO | 2004102833 | 11/2004 |
| WO | 2005-018098 | 2/2005 |
| WO | 2005/048613 | 5/2005 |
| WO | 2005-067194 | 7/2005 |
| WO | 2006/049441 | 5/2006 |
| WO | 2006/075820 | 7/2006 |
| WO | 2006104344 | 10/2006 |
| WO | 2006109851 | 10/2006 |
| WO | 2007/025138 | 3/2007 |
| WO | 2007052888 | 5/2007 |
| WO | 2007-078929 | 7/2007 |
| WO | 2007078155 | 7/2007 |
| WO | 2007078172 | 7/2007 |
| WO | 2007/133034 | 11/2007 |
| WO | 2008/054103 | 5/2008 |
| WO | 2008/111684 | 9/2008 |
| WO | WO 2009/084998 | * 7/2009 |

OTHER PUBLICATIONS

NTT Docomo, et al., "MAC PDU Structure for LTE", 3GPP TSG RAN WG2 #56bis, R2-070280, Jan. 15, 2007, XP050133369.

Catt, et al., "Enhancement to Buffer Status Reporting", 3GPP TSG RAN WG2 #57bis, R2-071345, Mar. 26, 2007, XP050134291.

LG Electronics Inc., "Contents of PDCP Status Report," R2-07xxxx, 3GPP TSG-RAN WG2 #59, Oct. 2007, XP-002580785.

LG Electronics Inc., "PDCP Retransmissions," R2-073041, 3GPP TSG-RAN WG2 #59, Aug. 2007, XP-050135778.
LG Electronics Inc., "PDCP Structure and Traffic Path," R2-073259, 3GPP TSG-RAN WG2 #59, Aug. 2007, XP-050135985.
Bosch, "Header Compression Signaling," TSG-RAN Working Group 2 (Radio Layer 2 and Radio Layer 3), TSGR2#9 (99)i32, Nov. 29, 1999, XP-050114120.
3rd Generation Partnership Project (3GPP), "Packet Data Convergence Protocol (PDCP) Specification (Release 7)," 3GPP TSG RAN Technical Specification, 3GPP TS 25.323, V7.4.0, Jul. 2003, XP-050367856.
ASUSTeK "Granularity Consideration for Variable RLC PDU Sizes," TSG-RAN WG2 Meeting #56bis, R2-070336, Jan. 15, 2007, XP-050133423.
3rd Generation Partnership Project (3GPP), "Medium Access Control (MAC) Protocol Specification (Release 7)," 3GPP TSG RAN Technical Specification, 3GPP TS 25.321, V7.4.0, Jul. 2003, XP-050367709.
Gao, Y., et al., "Research on the Access Network and MAC Technique for Beyond 3G Systems," IEEE Wireless Communications, vol. 14, No. 2, pp. 57-61, Apr. 2007, XP-011184637.
Alcatel-Lucent, "DL Control Signaling and Multiplexing for VoIP," R1-071721, 3GPP TSG RAN WG1 Meeting #48bis, Mar. 2007, XP-002460800.
NTT DoCoMo Inc., "MAC PDU Structure for LTE," R2-070280, 3GPP TSG RAN WG2 #56bis, Jan. 2007, XP-050133369.
LG Electronics Inc., "Support for VoIP over MAC-hs/ehs," R2-071542, 3GPP TSG-RAN WG2 #57bis, Mar. 2007, XP-050134474.
Nokia Corp. et al., "MAC Header Format," R2-073891, 3GPP TSG-RAN WG2 Meeting #59bis, Oct. 2007, XP-002602993.
3rd Generation Partnership Project (3GPP), "Technical Specification Group Radio Access Network; Evolved Universal Terrestrial Radio Access (E-UTRA) Medium Access Control (MAC) Protocol Specification (Release 8)," 3GPP TS 36.321, v8.1.0, Mar. 2008, XP-050377617.
LG Electronics Inc., "UL Timing Control Related to Contention Resolution," R2-081607, 3GPP TSG-RAN WG2 #61bis, Mar. 2008, XP-050139334.
Nokia, "Active mode DRX details", 3GPP TSG-RAN WGx Meeting #55, R2-062753, Oct. 2006, XP002437990.
Email Rapporteur (Nokia), "DRX in E-UTRAN", 3GPP TSG-RAN WG2 Meeting #57, R2-070463, Feb. 2007, XP050133530.
NTT DoCoMo Inc, "Views on DRX/DTX control in LTE", 3GPP TSG-RAN WG2 #56, R2-063397, Nov. 2006, XP050132870.
Ericsson, "MAC header for Improved L2 support for high data rates," R2-070810, 3GPP TSG-RAN WG2#57, Feb. 2007, XP-050133836.
Nokia, "Requirements for redirection in E-UTRAN", 3GPP TSG-RAN WG2 Meeting #56-bis R2-070107, Jan. 15-19, 2007.
LG Electronics, Inc.; "Relative Buffer Status Reporting"; 3GPP TSG-RAN WG2 Meeting #46bis; Beijing, China; Apr. 4, 2005; R2-050852.
IPWireless, "Layer 2 Functions for LTE"; 3GPP TSG RAN WG2 #48bis; Cannes, France; Oct. 10, 2005; Tdoc R2-052377.
Samsung; "Re-use of PDCP SN At ARQ Level?"; 3GPP TSG-RAN2 Meeting #53bis; Cannes, France; Jun. 27, 2006; Tdoc R2-061829.
Panasonic; "MAC PDU Format for LTE" 3GPP TSG RAN WG2 #56bis; Sorrento, Italy; Jan. 15, 2007; R2-070096.
Samsung; "Selective Forwarding/Retransmission During HO"; 3GPP TSG-RAN2 Meeting #56bis; Sorrento, Italy; Jan. 15, 2007; Tdoc R2-070130.
Ericsson, "Initial Random Access Procedure for E-UTRAN," R2-062853, 3GPP TSG-RAN WG2 #55, Oct. 2006.
Samsung, "LTE Random access procedure," R2-062258, 3GPP TSG RAN2 #54, Aug. 2006.
Siemens, "Initial Access Procedure," R2-061931, 3GPP TSG-RAN WG2 LTE AdHoc Meeting, Jun. 2006.
IPWireless, "Contention Resolution in Non-synchronous RACH Access," R2-062269, 3GPP RAN2 #54, Aug. 2006.

* cited by examiner

METHOD OF PERFORMING UPLINK SYNCHRONIZATION IN WIRELESS COMMUNICATION SYSTEM

CROSS-REFERENCE TO RELATED APPLICATIONS

This application claims the benefit of priority of U.S. Provisional application Ser. No. 60/944,785, filed on Jun. 18, 2007 and Korean Patent Application No. 10-2008-0023809 filed on Mar. 14, 2008, which are hereby incorporated by reference herein in their entirety.

BACKGROUND

1. Technical Field

The present invention relates to wireless communications, and more particularly, to a method of performing uplink synchronization in a wireless communication system.

2. Related Art

Third generation partnership project (3GPP) mobile communication systems based on a wideband code division multiple access (WCDMA) radio access technology are widely spread all over the world. High-speed downlink packet access (HSDPA) that can be defined as a first evolutionary stage of WCDMA provides 3GPP with a radio access technique that is highly competitive in the mid-term future. However, since requirements and expectations of users and service providers are continuously increased and developments of competing radio access techniques are continuously in progress, new technical evolutions in 3GPP are required to secure competitiveness in the future. Reduction of cost per bit, increase of service availability, flexible use of frequency bands, simple structure and open interface, proper power consumption of a user equipment (UE), and the like are defined as requirements.

In general, there are one or more cells within the coverage of a base station (BS). One cell may include a plurality of UEs. A UE is generally subjected to a random access procedure to access a network. The random access procedure is performed by the UE for the following purposes: (1) initial access; (2) handover; (3) scheduling request; and (4) timing synchronization. However, this is for exemplary purposes only, and thus the content or number of purposes for performing the random access procedure may vary depending on systems.

The random access procedure can be classified into a contention based random access procedure and a non-contention based random access procedure. Major difference between the two random access procedures lies in whether a random access preamble is dedicatedly assigned to one UE. In the non-contention based access procedure, since a UE uses only the random access preamble dedicatedly assigned to the UE, contention (or collision) with another UE does not occur. The contention occurs when two or more UEs attempt the random access procedure by using the same random access preamble through the same resource. In the contention based random access procedure, there is a possibility of contention since a random access preamble used by the UEs is randomly selected.

In an orthogonal frequency division multiplexing (OFDM)-based wireless communication system, timing synchronization between a UE and a BS is important so as to minimize interference between users. The random access procedure is performed for uplink synchronization. While the random access procedure is performed, the UE is time-synchronized according to a time alignment value transmitted from the BS. When uplink synchronization is achieved, the UE runs a time alignment timer. If the time alignment timer is running, it is regarded that the UE and the BS are uplink-synchronized with each other. If the time alignment timer is expired or is not running, it is regarded that the UE and the BS are not synchronized with each other. In this case, uplink transmission cannot be achieved except for transmission of the random access preamble.

A random access failure may occur in the contention based random access procedure since there is always a possibility of contention. Therefore, a method is needed for performing uplink synchronization caused by the random access failure.

SUMMARY

The present invention provides a method of performing uplink synchronization while a contention based random access procedure is performed in a wireless communication system.

The present invention also provides a method of avoiding interference to other user equipments due to incorrect uplink synchronization in a wireless communication system.

In an aspect, a method of performing uplink synchronization in a wireless communication system is provided. The method includes transmitting a random access preamble which is randomly selected from a set of random access preambles, receiving a random access response, the random access response comprising a random access preamble identifier corresponding to the random access preamble and a time alignment value for uplink synchronization, starting a time alignment timer after applying the time alignment value, starting a contention resolution timer after receiving the random access response, wherein contention resolution is not successful when the contention resolution timer is expired, and stopping the time alignment timer when the contention resolution timer is expired.

The method can further include transmitting a scheduled message, the scheduled message comprising a unique identifier and stopping the contention resolution timer when receiving a contention resolution message, the contention resolution message comprising an identifier corresponding to the unique identifier. The contention resolution timer may be started when transmitting the scheduled message.

In another aspect, a method of performing uplink synchronization in a wireless communication system is provided. The method includes transmitting a random access preamble which is randomly selected from a set of random access preambles, receiving a random access response, the random access response comprising a random access preamble identifier corresponding to the random access preamble, starting a time alignment timer after receiving a random access response and stopping the time alignment timer when contention resolution is not successful.

DESCRIPTION OF EXEMPLARY EMBODIMENTS

Figure 1:
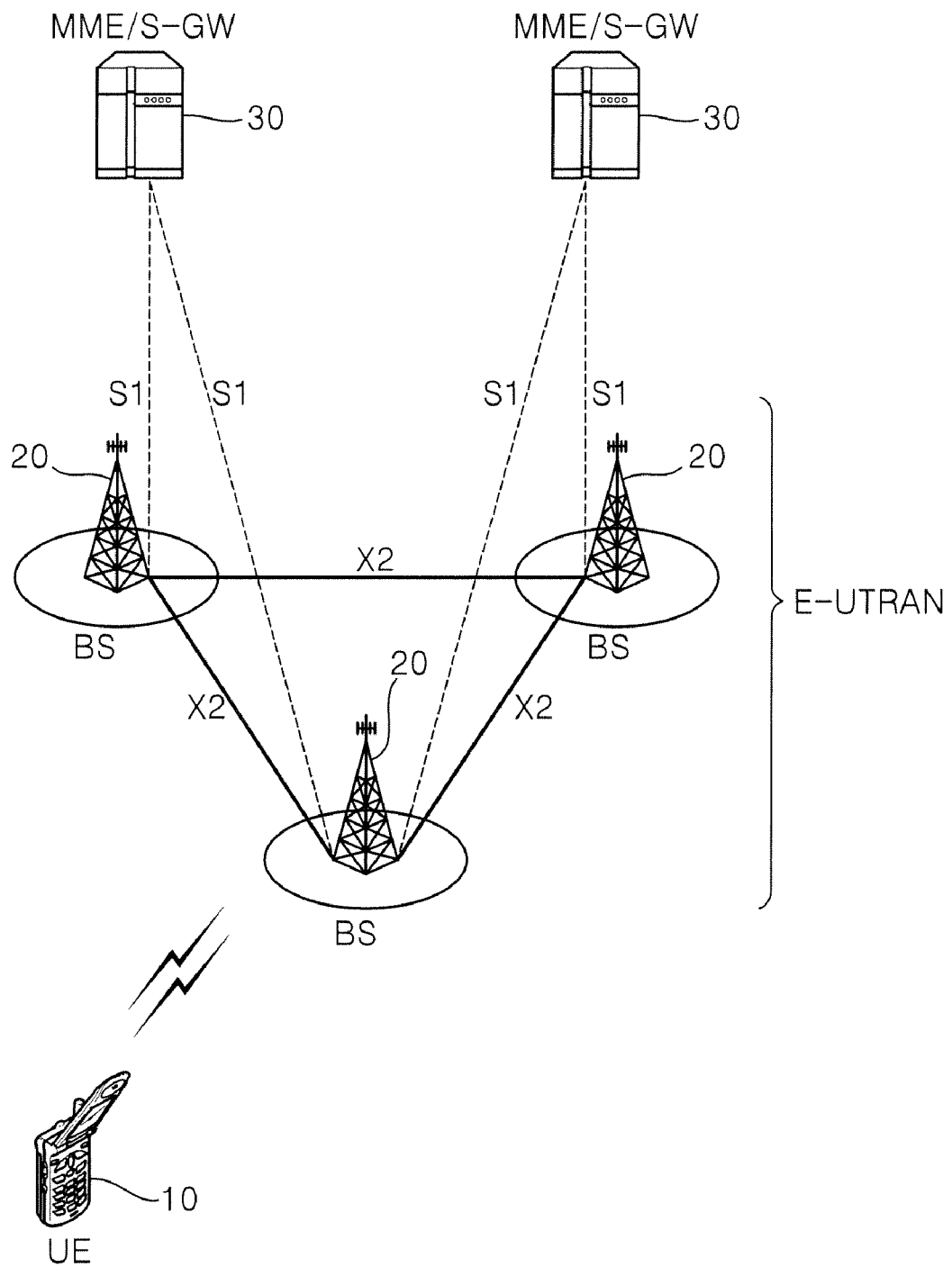
FIG. 1 shows a structure of a wireless communication system.

FIG. 1 shows a structure of a wireless communication system. The wireless communication system may have a network structure of an evolved-universal mobile telecommunications system (E-UMTS). The E-UMTS may be referred to as a long-term evolution (LTE) system. The wireless communication system can be widely deployed to provide a variety of communication services, such as voices, packet data, etc.

Referring to FIG. 1, an evolved-UMTS terrestrial radio access network (E-UTRAN) includes at least one base station (BS) 20 which provides a control plane and a user plane.

A user equipment (UE) 10 may be fixed or mobile, and may be referred to as another terminology, such as a mobile station (MS), a user terminal (UT), a subscriber station (SS), a wireless device, etc. The BS 20 is generally a fixed station that communicates with the UE 10 and may be referred to as another terminology, such as an evolved node-B (eNB), a base transceiver system (BTS), an access point, etc. There are one or more cells within the coverage of the BS 20. Interfaces for transmitting user traffic or control traffic may be used between the BSs 20. Hereinafter, downlink is defined as a communication link from the BS 20 to the UE 10, and uplink is defined as a communication link from the UE 10 to the BS 20.

The BSs 20 are interconnected by means of an X2 interface. The BSs 20 are also connected by means of an S1 interface to an evolved packet core (EPC), more specifically, to a mobility management entity (MME)/serving gateway (S-GW) 30. The S1 interface supports a many-to-may relation between the BS 20 and the MME/S-GW 30.

Figure 2:
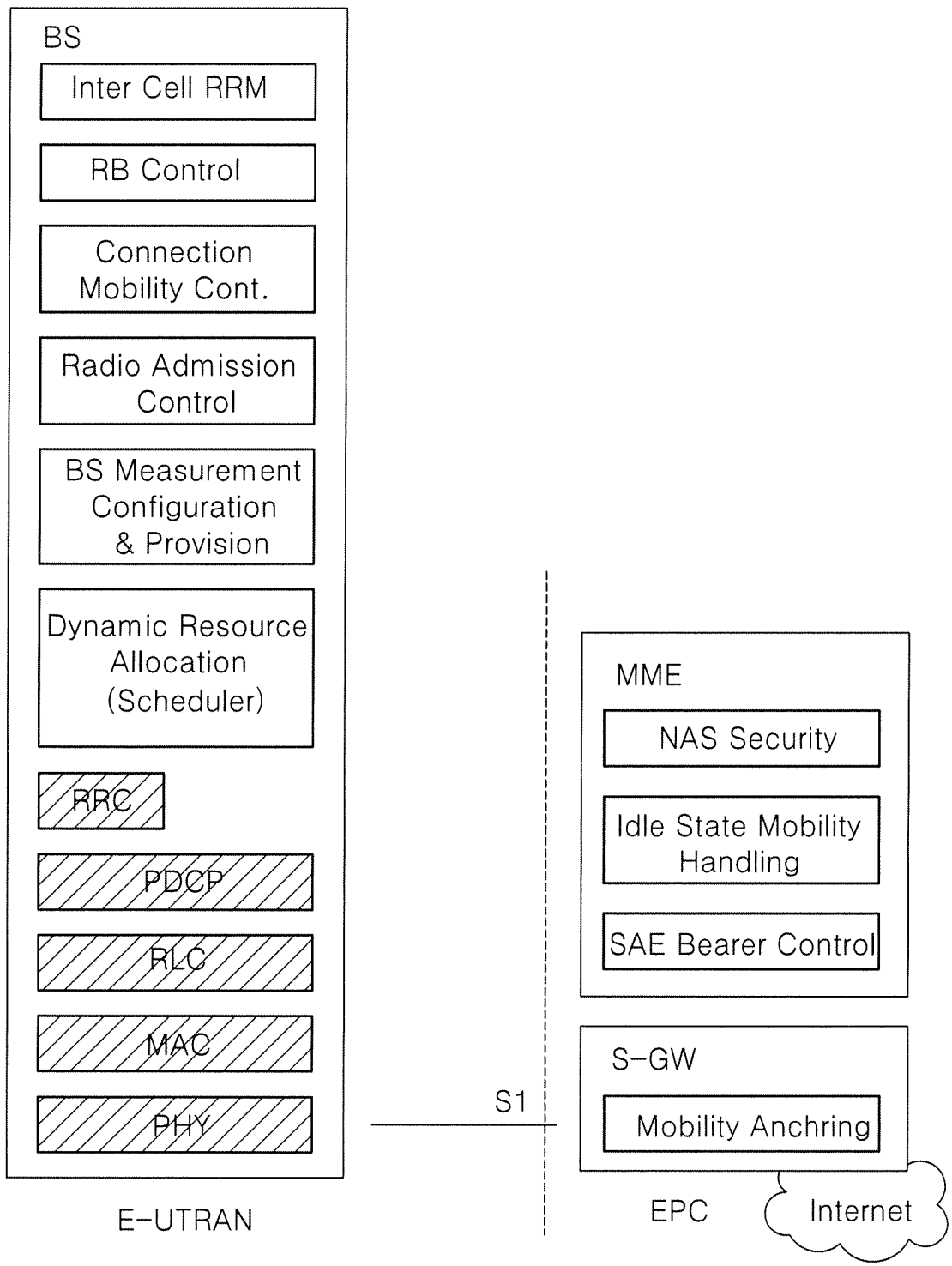
FIG. 2 is a diagram showing functional split between an evolved universal terrestrial radio access network (E-UTRAN) and an evolved packet core (EPC).

FIG. 2 is a diagram showing functional split between the E-UTRAN and the EPC.

Referring to FIG. 2, slashed boxes indicate radio protocol layers and white boxes indicate functional entities of the control plane.

The BS performs the following functions: (1) functions for radio resource management (RRM) such as radio bearer control, radio admission control, connection mobility control, and dynamic allocation of resources to the UE; (2) Internet protocol (IP) header compression and encryption of user data streams; (3) routing of user plane data to the S-GW; (4) scheduling and transmission of paging messages; (5) scheduling and transmission of broadcast information; and (6) measurement and measurement reporting configuration for mobility and scheduling.

The MME performs the following functions: (1) distribution of paging messages to the BSs; (2) security control; (3) idle state mobility control; (4) system architecture evolution (SAE) bearer control; and (5) ciphering and integrity protection of non-access stratum (NAS) signaling.

The S-GW performs the following functions: (1) termination of a user plane packet for paging; and (2) user plane switching for the support of UE mobility.

Figure 3:
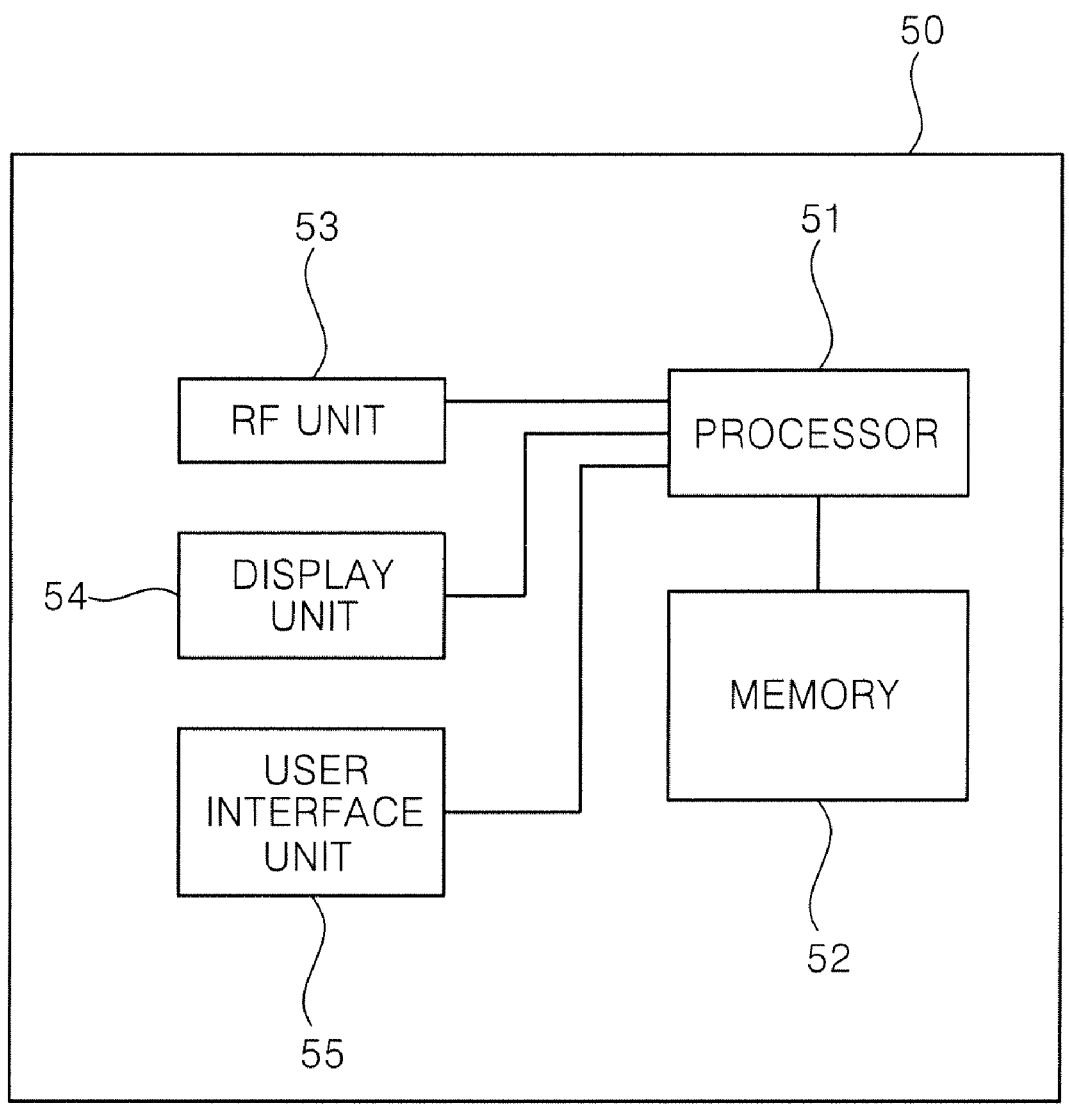
FIG. 3 is a block diagram showing constitutional elements of a user equipment (UE).

FIG. 3 is a block diagram showing constitutional elements of the UE. A UE 50 includes a processor 51, a memory 52, a radio frequency (RF) unit 53, a display unit 54, and a user interface unit 55. Layers of a radio interface protocol are implemented in the processor 51. The processor 51 provides the control plane and the user plane. The function of each layer can be implemented in the processor 51. The memory 52 is coupled to the processor 51 and stores an operating system, applications, and general files. The display unit 54 displays a variety of information of the UE 50 and may use a well-known element such as a liquid crystal display (LCD), an organic light emitting diode (OLED), etc. The user interface unit 55 can be configured with a combination of well-known user interfaces such as a keypad, a touch screen, etc. The RF unit 53 is coupled to the processor 51 and transmits and/or receives radio signals.

Layers of a radio interface protocol between the UE and the network can be classified into L1 layer (a first layer), L2 layer (a second layer), and L3 layer (a third layer) based on the lower three layers of the open system interconnection (OSI) model that is well-known in a communication system. A physical layer, or simply a PHY layer, belongs to the first layer and provides an information transfer service through a physical channel. A radio resource control (RRC) layer belongs to the third layer and serves to control radio resources between the UE and the network. The UE and the network exchange RRC messages via the RRC layer.

Figure 4:
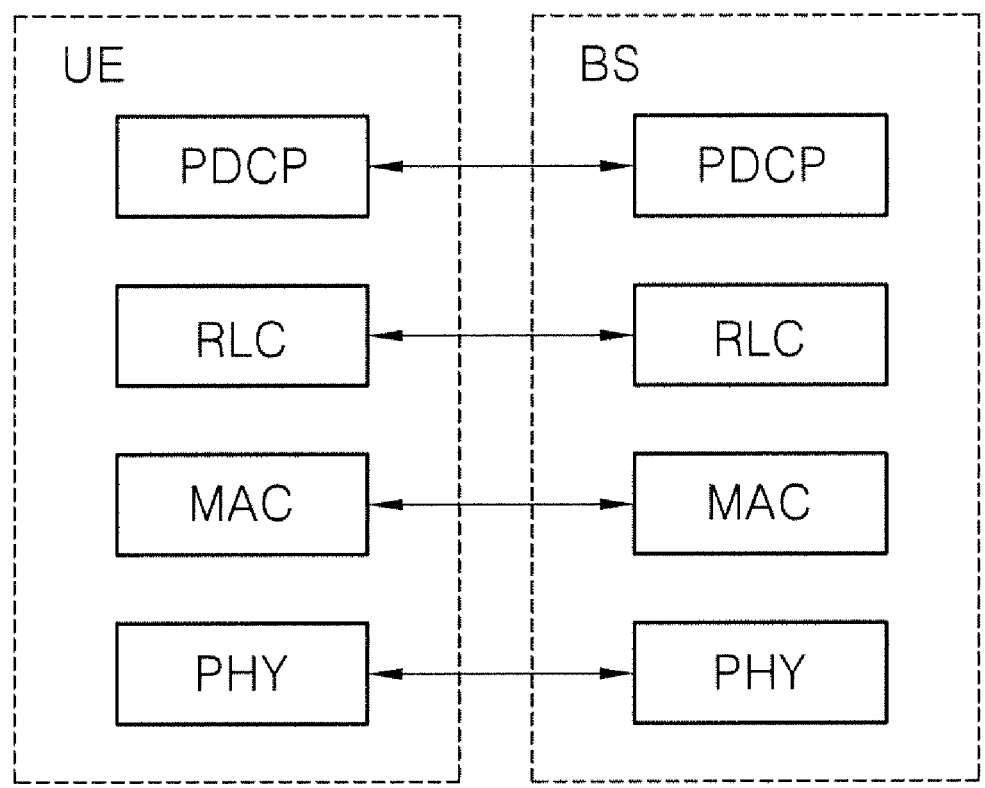
FIG. 4 is a diagram showing a radio protocol architecture for a user plane.
Figure 5:
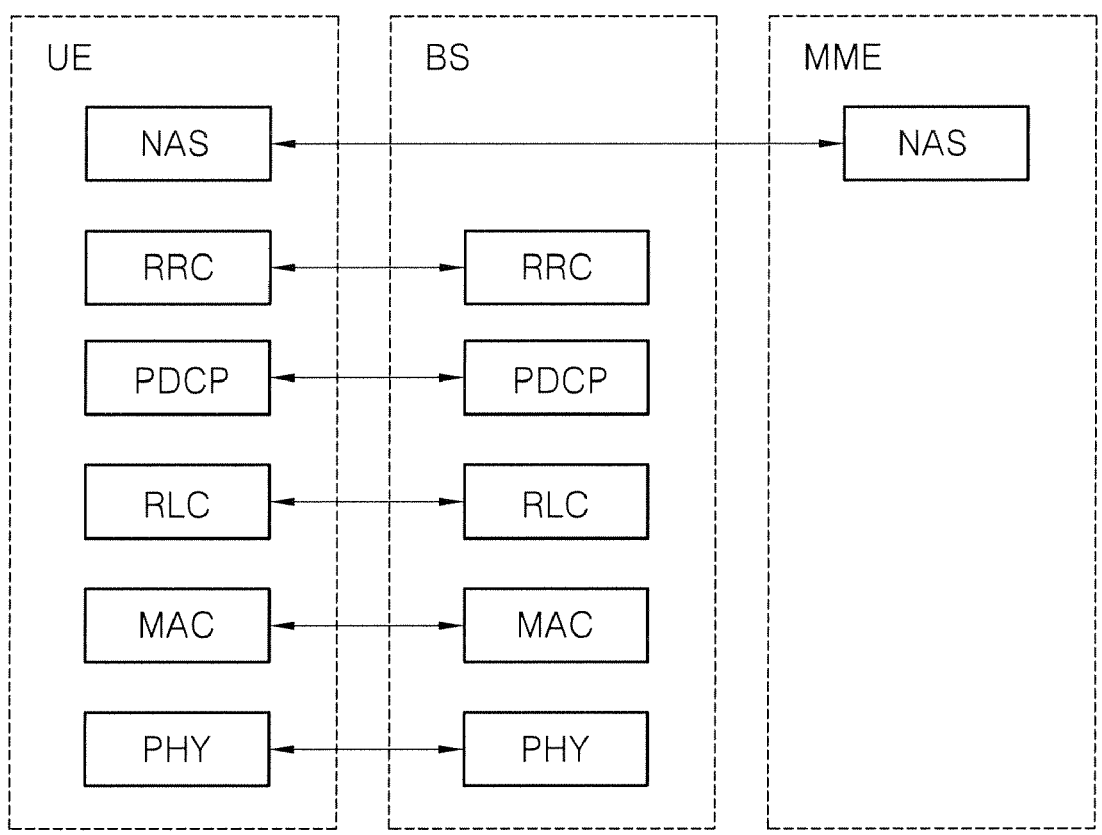
FIG. 5 is a diagram showing a radio protocol architecture for a control plane.

FIG. 4 is a diagram showing a radio protocol architecture for the user plane. FIG. 5 is a diagram showing a radio protocol architecture for the control plane. They illustrate an architecture of a radio interface protocol between the UE and the E-UTRAN. The user plane is a protocol stack for user data transmission. The control plane is a protocol stack for control signal transmission.

Referring to FIGS. 4 and 5, a PHY layer belongs to the first layer and provides an upper layer with an information transfer service through a physical channel. The PHY layer is coupled with a medium access control (MAC) layer, i.e., an upper layer of the PHY layer, through a transport channel. Data is transferred between the MAC layer and the PHY layer through the transport channel. Between different PHY layers (i.e., a PHY layer of a transmitter and a PHY layer of a receiver), data are transferred through the physical channel. The PHY layer can be modulated by orthogonal frequency division multiplexing (OFDM). Time and/or frequency can be utilized as radio resources.

The MAC layer belongs to the second layer and provides services to a radio link control (RLC) layer, i.e., an upper layer of the MAC layer, through a logical channel. The RLC layer in the second layer supports reliable data transfer. There are three operating modes in the RLC layer, that is, a transparent mode (TM), an unacknowledged mode (UM), and an acknowledged mode (AM) according to a data transfer method. An AM RLC provides bidirectional data transmission services and supports retransmission when the transfer of a RLC protocol data unit (PDU) fails.

A packet data convergence protocol (PDCP) layer belongs to the second layer and performs a header compression function. When transmitting an IP packet such as an IPv4 packet or an IPv6 packet, a header of the IP packet may contain relatively large and unnecessary control information. The PDCP layer reduces a header size of the IP packet so as to efficiently transmit the IP packet.

A radio resource control (RRC) layer belongs to the third layer and is defined only in the control plane. The RRC layer serves to control the logical channel, the transport channel, and the physical channel in association with configuration, reconfiguration and release of radio bearers (RBs). A RB is a service provided by the second layer for data transmission between the UE and the E-UTRAN. When an RRC connection is established between an RRC layer of the UE and an RRC layer of the network, it is called that the UE is in an RRC connected mode. When the RRC connection is not established yet, it is called that the UE is in an RRC idle mode.

A non-access stratum (NAS) layer belongs to an upper layer of the RRC layer and serves to perform session management and mobility management.

A downlink transport channel is a channel through which data is transmitted from the network to the UE. Examples of the downlink transport channel include a broadcast channel (BCH) for transmitting system information and a downlink-shared channel (DL-SCH) for transmitting user traffic or control messages. User traffic of downlink multicast (or broadcast) services or control messages can be transmitted on the DL-SCH or a downlink multicast channel (MCH). An uplink transport channel is a channel through which data is transmitted from the UE to the network. Examples of the uplink transport channel include a random access channel (RACH) for transmitting initial control messages and an uplink-shared channel (UL-SCH) for transmitting user traffic or control messages.

A downlink physical channel is mapped to the downlink transport channel. Examples of the downlink physical channel include a physical broadcast channel (PBCH) for transmitting information of the BCH, a physical multicast channel (PMCH) for transmitting information of the MCH, a physical downlink shared channel (PDSCH) for transmitting information of the PCH and the DL-SCH, and a physical downlink control channel (PDCCH) for transmitting control information such as downlink or uplink scheduling grant, which are provided from the first layer and the second layer. The PDCCH is also referred to as a downlink L1/L2 control channel. An uplink physical channel is mapped to the uplink transport channel. Examples of the uplink physical channel include a physical uplink shared channel (PUSCH) for transmitting information of the UL-SCH, a physical random access channel (PRACH) for transmitting information of the RACH, and a physical uplink control channel (PUCCH) for transmitting control information such as hybrid automatic repeat request (HARQ) acknowledgement (ACK)/non-acknowledgement (NACK) signals, a scheduling request signal, and a channel quality indicator (CQI), which are provided from the first layer and the second layer.

Now, the random access procedure will be described. A UE performs the random access procedure in the process of performing the following operations, such as, (1) initial access, (2) handover, (3) transmission of downlink data to a non-synchronized UE, (4) transmission of uplink data by the non-synchronized UE, and (5) restoration of radio link failure.

Figure 6:
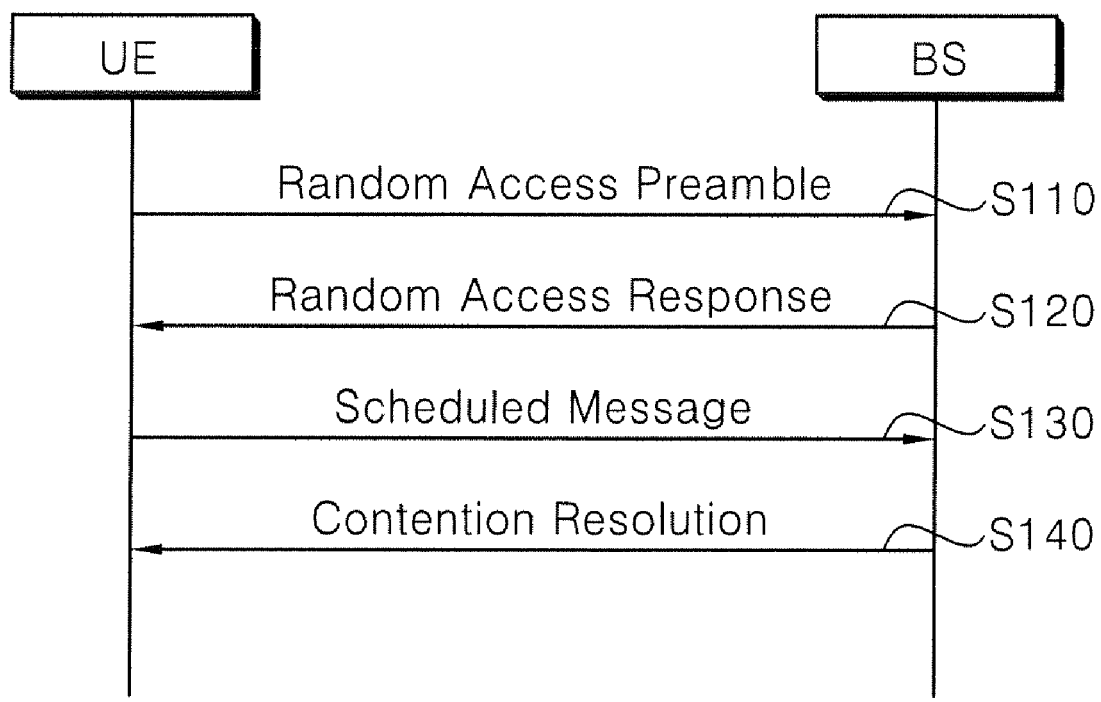
FIG. 6 is a flow diagram showing a random access procedure.

FIG. 6 is a flow diagram showing the random access procedure.

Referring to FIG. 6, in step S110, a UE transmits a random access preamble to a BS through a selected random access resource by using system information received from the BS. The system information includes information on a set of available random access preambles. The random access preamble transmitted by the UE is selected from the set of random access preambles.

In step S120, the BS transmits a random access response through a DL-SCH. The random access response includes a time alignment value for uplink synchronization of the UE, uplink radio resource allocation information, an index of the random access preamble received to identify the UE performing the random access procedure, and a temporary identifier (e.g., temporary cell-radio network temporary identity (C-RNTI)) of the UE.

In step S130, the UE applies the time alignment value, and transmits a scheduled message including a unique identifier of the UE to the BS by using the uplink radio resource allocation information. The unique identifier of the UE may be the C-RNTI, a SAE temporary mobile station identifier (S-TMSI), or an upper-layer identifier. The unique identifier is also referred to as a contention resolution identifier since it is used for contention resolution.

In step S140, after receiving the scheduled message, the BS transmits to the UE a contention resolution message including the unique identifier of the UE.

Due to the limited number of available random access preambles, contention occurs in the random access procedure. Since it is not possible to assign unique random access preambles to all UEs located in a cell, the UEs select one random access preamble from the set of the available random access preambles and then transmit the selected random access preamble. Accordingly, two or more UEs can select and transmit the same random access preamble through the same random access resource. This is a case where contention occurs. Upon receiving the random access preamble, the BS transmits the random access response for the random access preamble in a state where the BS does not know the occurrence of contention. However, since contention has occurred, two or more UEs receive the same random access response and thus transmit scheduled messages according to information included in the random access response. That is, the two or more UEs transmit different scheduled messages according to the uplink radio resource allocation information included in the random access response. In this case, the BS may fail to receive all of the scheduled messages, or may successfully receive only a scheduled message of a specific UE according to the location or transmit (Tx) power of the UEs. If the BS successfully receives the scheduled message, the BS transmits the contention resolution message by using the unique identifier of the UE, wherein the unique identifier is included in the scheduled message. The UE can know that the contention resolution is successful when the unique identifier of the UE is received. The contention resolution allows the UE to know whether the contention is successful or not in the contention based random access procedure.

A contention resolution timer is used for the contention resolution. The contention resolution timer starts after the random access response is received. The contention resolution timer may start when the UE transmits the scheduled message. When the contention resolution timer is expired, it is determined that the contention resolution is unsuccessful, and thus a new random access procedure is performed. When the UE receives the contention resolution message including the unique identifier of the UE, the contention resolution timer stops, and the UE determines that the contention resolution is successful. If the UE already has a unique cell identifier (e.g., C-RNTI) before the random access procedure is performed, the UE transmits the scheduled message including the cell identifier of the UE and then starts the contention resolution timer. If the UE receives a PDCCH, which is addressed by the cell identifier of the UE, before the contention resolution timer is expired, the UE determines that the contention is successful and then finishes the random access procedure without errors. If the UE does not have the C-RNTI, the upper-layer identifier may be used as the unique identifier. After transmitting the scheduled message including the upper-layer identifier, the UE starts the contention resolution timer. If the contention resolution message including the upper-layer identifier of the UE is received on the DL-SCH before the contention resolution timer is expired, the UE determines that the random access procedure is successful. The contention resolution message is received by using the PDCCH addressed by the temporary C-RNTI. Otherwise, if the aforementioned contention resolution is not received on the DL-SCH until the contention resolution timer is expired, the UE determines that the contention is unsuccessful.

Now, time alignment for uplink synchronization will be described. In an OFDM-based system, timing synchronization between a UE and a BS is important so as to minimize interference between users.

The random access procedure is one of uplink time synchronization methods. That is, the BS measures the time alignment value through the random access preamble transmitted by the UE, and provides the time alignment value to the UE through the random access response. Upon receiving the random access response, the UE applies the time alignment value and starts the time alignment timer. Time synchronization between the UE and the BS is maintained while the time alignment timer is running. If the time alignment timer is expired or is not running, it is regarded that the time synchronization between the UE and the BS is not maintained. If the time alignment timer is expired and is not running, the UE can transmit only the random access preamble, and any other uplink transmission cannot be achieved.

When contention occurs in the process of performing the random access procedure, the UE may apply an incorrect time alignment value. If the UE is not time-synchronized with the BS before the UE transmits the random access preamble, the random access preamble may be mistakenly transmitted in uplink because of the time alignment timer currently running.

First, in a state whether uplink synchronization is not achieved between the UE and the BS, the UE transmits to the BS the random access preamble which is randomly selected, and receives the random access response for the random access preamble. Even if contention occurs, the UE can receive the random access response. In this case, since the UE cannot know the occurrence of contention, the UE applies to the UE itself the time alignment value included in the received random access response, and starts the time alignment timer. Subsequently, the UE transmits to the BS the scheduled message including the unique identifier of the UE and starts the contention resolution timer. If the UE does not receive the contention resolution message addressed by the unique identifier of the UE until the contention resolution timer is expired, the UE retries the random access procedure. However, since the time alignment timer is continuously running, the UE may transmit uplink data when the BS transmits downlink data. This is because the UE determines that uplink synchronization is achieved by the time alignment timer currently running, even in a case where uplink synchronization is not achieved. The incorrect uplink synchronization may result in interference to other users during transmission.

Figure 7:
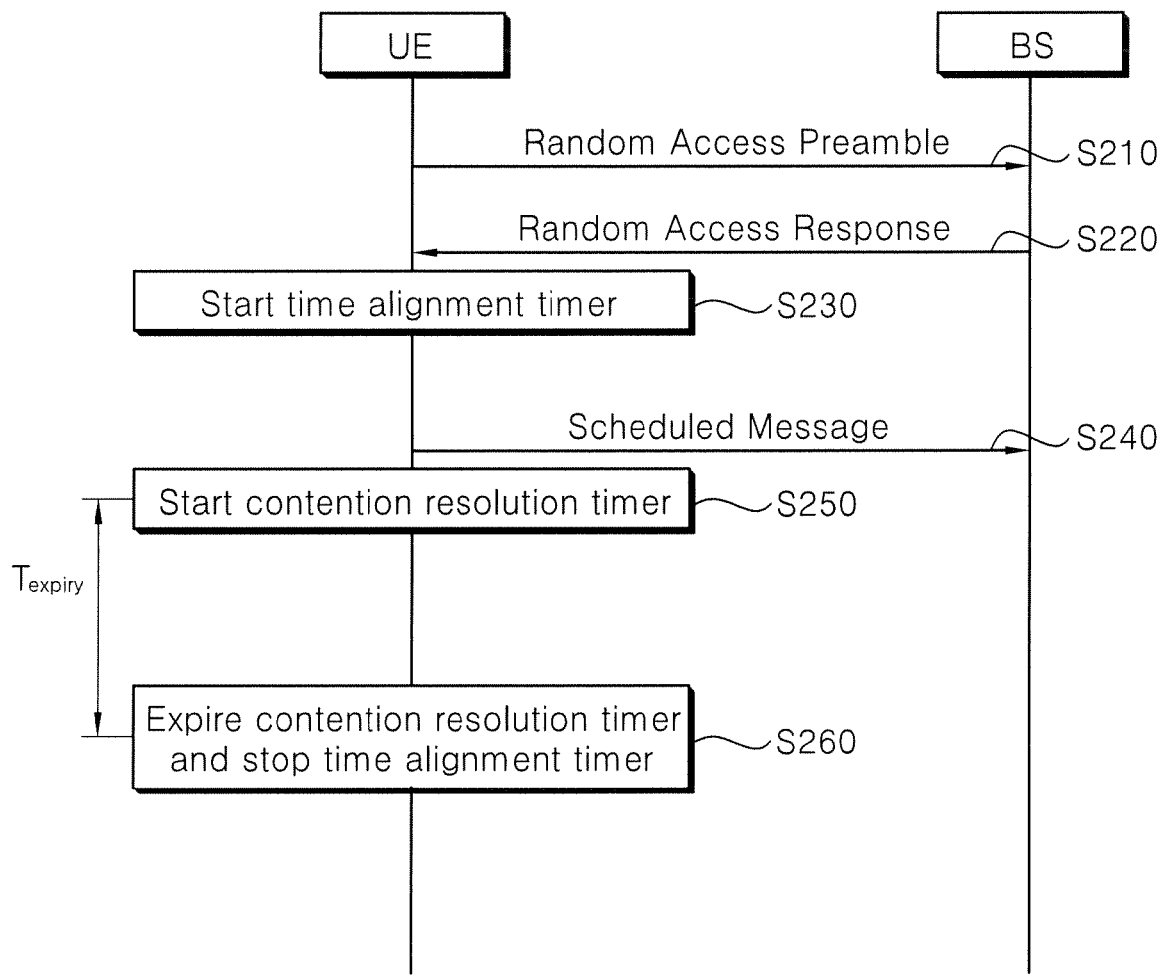
FIG. 7 is a flow diagram showing a method of performing uplink synchronization according to an embodiment of the present invention.

FIG. 7 is a flow diagram showing a method of performing uplink synchronization according to an embodiment of the present invention. At first, a UE is in a state where a time alignment timer is expired or is not running. This is a case where a contention based random access procedure starts when the UE attempts initial network entry or when a cell is searched for again due to a radio link failure.

Referring to FIG. 7, in step S210, the UE transmits to a BS a random access preamble which is randomly selected. In step S220, in response to the random access preamble, the BS transmits a random access response to the UE. The random access response includes uplink radio resource allocation information, a random access preamble identifier, a time alignment value, and a temporary C-RNTI. In step S230, the UE applies the time alignment value included in the random access response, and starts the time alignment timer.

In step S240, through the uplink radio resource allocation information included in the random access response, the UE transmits to the BS a scheduled message including a unique identifier of the UE. In step S250, the UE transmits the scheduled message and then starts a contention resolution timer.

In step S260, if the UE does not receive a contention resolution message including the unique identifier of the UE until the contention resolution timer is expired, the UE stops the time alignment timer. In this case, the UE may determine that the contention is unsuccessful, and thus retry the random access procedure.

If the random access failure occurs, the UE stops the time alignment timer which has been previously running. This is because the previously received time alignment value can be for another UE. Therefore, since the time alignment timer is stopped, uplink transmission is prevented from using the incorrect time alignment value.

Figure 8:
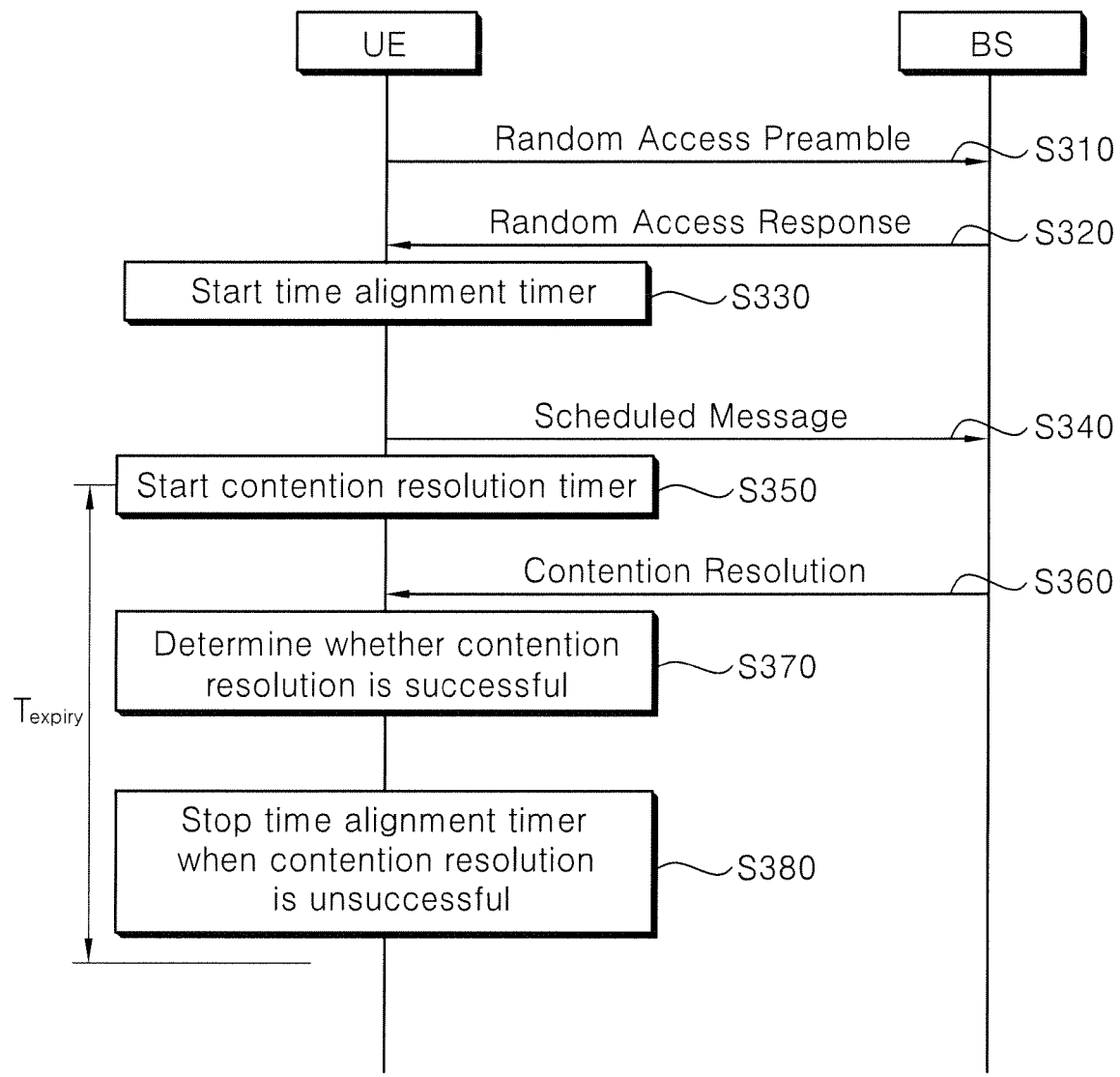
FIG. 8 is a flow diagram showing a method of performing uplink synchronization according to another embodiment of the present invention.

FIG. 8 is a flow diagram showing a method of performing uplink synchronization according to another embodiment of the present invention.

Referring to FIG. 8, in step S310, a UE transmits to a BS a random access preamble which is randomly selected. In step S320, in response to the random access preamble, the BS transmits a random access response to the UE. The random access response includes a time alignment value and temporary C-RNTI. In step S330, the UE applies the time alignment value and starts a time alignment timer. In step S340, the UE transmits to the BS a scheduled message including a unique identifier of the UE through uplink radio resource allocation information included in the random access response. In step S350, after transmitting the scheduled message, the UE starts a contention resolution timer.

In step S360, before the contention resolution timer is expired, the UE receives a contention resolution message indicated by PDCCH addressed by the temporary C-RNTI. The contention resolution message includes a contention resolution identifier. In step S370, the UE determines whether the contention is successful through the contention resolution identifier. For example, the contention resolution identifier can be compared with the identifier included in the scheduled message. If the two identifiers are not identical, it is determined that the contention is unsuccessful.

In step S380, if it is determined that the contention is unsuccessful, the UE stops the time alignment timer. In this case, the UE may retry the random access procedure or may report to an upper layer that the contention is unsuccessful.

If the contention is unsuccessful in the random access procedure, the UE stops the time alignment timer currently running. Accordingly, a problem can be solved in which the time alignment timer continuously runs even when uplink synchronization is not achieved.

Incorrect uplink synchronization can be avoided even if contention resolution is unsuccessful. Therefore, interference to other user equipments can be mitigated and service delay due to incorrect uplink synchronization can be prevented.

The steps of a method described in connection with the embodiments disclosed herein may be implemented by hardware, software or a combination thereof. The hardware may be implemented by an application specific integrated circuit (ASIC) that is designed to perform the above function, a digital signal processing (DSP), a programmable logic device (PLD), a field programmable gate array (FPGA), a processor, a controller, a microprocessor, the other electronic unit, or a combination thereof. A module for performing the above function may implement the software. The software may be stored in a memory unit and executed by a processor. The memory unit or the processor may employ a variety of means that is well known to those skilled in the art.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims. Therefore, all changes and modifications that fall within the metes and bounds of the claims, or equivalence of such metes and bounds are intended to be embraced by the appended claims.

What is claimed is:

1. A method of performing uplink synchronization in a wireless communication system, the method comprising:
    transmitting a random access preamble from a user equipment (UE) to a network, the random access preamble selected by the UE from a set of random access preambles;
    receiving at the UE a random access response from the network, the random access response comprising a temporary UE identifier and a time alignment value for uplink synchronization with the network;
    starting a time alignment timer in the UE responsive to receiving of the time alignment value;
    determining whether contention resolution is successful between the UE and the network; and
    stopping the time alignment timer in the UE if the contention resolution is not successful.

2. The method of claim 1, further comprising:
    receiving in the UE an uplink radio resource assignment with the received random access response; and
    transmitting a scheduled message to the network using the uplink radio resource assignment.

3. A method of performing uplink synchronization in a wireless communication system, the method comprising:
    transmitting a random access preamble from a user equipment (UE) to a network, the random access preamble selected by the UE from a set of random access preambles;
    receiving at the UE a random access response from the network, the random access response comprising a temporary UE identifier;
    starting a time alignment timer in the UE after receiving the random access response;
    determining in the UE whether contention resolution between the UE and the network is successful; and
    stopping the time alignment timer in the UE if the contention resolution between the UE and the network is determined not successful.

4. The method of claim 3, further comprising:
    receiving in the UE a time alignment value with the received random access response; and
    processing the time alignment value in the UE for uplink synchronization with the network.

5. The method of claim 3, further comprising starting a contention resolution timer in the UE after receiving the random access response from the network.

6. The method of claim 5, wherein the contention resolution between the UE and the network is determined not successful if the contention resolution timer is expired.

7. The method of claim 3, further comprising transmitting a scheduled message from the UE to the network after the UE receives the random access response, the scheduled message comprising a unique UE identifier.

8. The method of claim 7, wherein the contention resolution between the UE and the network is determined not successful when a contention resolution message comprising a contention resolution identifier corresponding to the unique UE identifier is transmitted from the network and not received by the UE.

9. The method of claim 8, further comprising starting a contention resolution timer in the UE when transmitting the scheduled message, wherein the contention resolution between the UE and the network is determined not successful if the contention resolution message is not received by the UE before the contention resolution timer expires.

10. A user equipment (UE) performing uplink synchronization in a wireless communication system, the UE comprising:
    a processor selecting a random access preamble from a set of random access preambles;
    a transmitter transmitting the selected random access preamble to a network;
    a receiver receiving a random access response from the network, the random access response comprising a temporary UE identifier and a time alignment value for uplink synchronization with the network;
    the processor starting a time alignment timer in the UE responsive to receiving of the time alignment value;
    the processor determining whether contention resolution is successful between the UE and the network; and
    the processor stopping the time alignment timer in the UE if the contention resolution is not successful.

11. The UE of claim 10, further comprising:
    the receiver receiving an uplink radio resource assignment with the received random access response; and
    the transmitter transmitting a scheduled message to the network using the uplink radio resource assignment.

12. A user equipment (UE) performing uplink synchronization in a wireless communication system, the UE comprising:
    a processor selecting a random access preamble from a set of random access preambles;
    a transmitter transmitting the selected random access preamble to a network;
    a receiver receiving a random access response from the network, the random access response comprising a temporary UE identifier;
    the processor starting a time alignment timer in the UE after the random access response is received;
    the processor determining whether contention resolution between the UE and the network is successful; and
    the processor stopping the time alignment timer in the UE if the contention resolution between the UE and the network is determined not successful.

13. The UE of claim 12, further comprising:
    the receiver receiving a time alignment value with the received random access response; and
    the processor processing the time alignment value for uplink synchronization with the network.

14. The UE of claim 12, wherein the processor starts a contention resolution timer in the UE after the random access response is received from the network.

15. The UE of claim 14, wherein the contention resolution between the UE and the network is determined not successful by the processor if the contention resolution timer is expired.

16. The UE of claim 12, wherein the transmitter transmits a scheduled message from the UE to the network after the random access response is received, the scheduled message comprising a unique UE identifier.

17. The UE of claim 16, wherein the contention resolution between the UE and the network is determined not successful when a contention resolution message comprising a contention resolution identifier corresponding to the unique UE identifier is transmitted from the network and not received by the receiver.

18. The UE of claim 17, wherein the processor starts a contention resolution timer in the UE when the scheduled message is transmitted, wherein the contention resolution between the UE and the network is determined not successful if the contention resolution message is not received by the receiver before the contention resolution timer expires.

* * * * *